(12) United States Patent
Sundberg (10) Patent No.: US 12,392,570 B2
(45) Date of Patent: Aug. 19, 2025

(54) SPRING ARRANGEMENT FOR COUNTERMEASURE MAGAZINES

(71) Applicant: SAAB AB, Linköping (SE)

(72) Inventor: Richard Sundberg, Bro (SE)

(73) Assignee: SAAB AB, Linköping (SE)

( * ) Notice: Subject to any disclaimer, the term of this patent is extended or adjusted under 35 U.S.C. 154(b) by 0 days.

(21) Appl. No.: 18/041,596

(22) PCT Filed: Aug. 18, 2021

(86) PCT No.: PCT/SE2021/050805
§ 371 (c)(1),
(2) Date: Feb. 14, 2023

(87) PCT Pub. No.: WO2022/039656
PCT Pub. Date: Feb. 24, 2022

(65) Prior Publication Data
US 2023/0296338 A1     Sep. 21, 2023

(30) Foreign Application Priority Data
Aug. 18, 2020   (SE) .................................. 2000143-4

(51) Int. Cl.
*F41A 9/64*   (2006.01)
(52) U.S. Cl.
CPC .................... *F41A 9/64* (2013.01)
(58) Field of Classification Search
CPC .......... F42B 39/24; F42B 39/26; F42B 39/28; G21C 3/3563; F41F 3/052; F41A 9/64
USPC ............................................................ 206/3
See application file for complete search history.

(56) References Cited

U.S. PATENT DOCUMENTS

| 3,425,586 | A | * | 2/1969 | Claus | F41F 3/052 220/23.4 |
| 3,708,563 | A | * | 1/1973 | Sells | F42B 39/26 264/46.7 |
| 3,731,585 | A | * | 5/1973 | Demberg | F42B 39/14 206/499 |
| 3,746,619 | A | * | 7/1973 | Iwao | G21C 3/3563 376/442 |
| 3,751,335 | A | * | 8/1973 | Eggert | G21C 3/3563 376/442 |

(Continued)

FOREIGN PATENT DOCUMENTS

| CN | 114018100 A | * | 2/2022 |
| CN | 115077295 A | * | 9/2022 |

(Continued)

OTHER PUBLICATIONS

International Search Report and Written Opinion mailed Sep. 9, 2021 for International Application No. PCT/SE2021/050805, 16 pages.

*Primary Examiner* — Gabriel J. Klein
(74) *Attorney, Agent, or Firm* — Sage Patent Group (57) ABSTRACT

The present invention relates to a spring arrangement for use in a countermeasure magazine, said spring arrangement including a plurality of elements, wherein each one of said elements has a base portion and a plurality of spring portions extending from a first edge of said base portion, and wherein said spring portions of each element are distributed along a length of said base portion, and wherein said elements include mating connection means such that said elements may be connected to each other.

10 Claims, 8 Drawing Sheets

(56) References Cited

U.S. PATENT DOCUMENTS

| | | | | | |
|---|---|---|---|---|---|
| 3,933,584 | A | * | 1/1976 | Litt | G21C 3/322 376/442 |
| 4,163,690 | A | * | 8/1979 | Jabsen | G21C 3/3563 376/442 |
| 4,474,730 | A | * | 10/1984 | Hellman | G21C 3/3563 376/442 |
| 4,619,181 | A | | 10/1986 | Pehker et al. | |
| 4,879,090 | A | * | 11/1989 | Perrotti | G21C 3/3563 376/442 |
| 5,024,810 | A | * | 6/1991 | Bachman | G21C 3/322 376/442 |
| 5,115,711 | A | * | 5/1992 | Bushagour | F41F 3/042 89/1.816 |
| 5,331,678 | A | * | 7/1994 | Hatfield | G21C 3/3563 376/442 |
| 5,413,024 | A | * | 5/1995 | Plummer | F41F 3/065 89/1.816 |
| 5,461,960 | A | * | 10/1995 | Marks | H01R 31/06 89/1.51 |
| 5,554,815 | A | * | 9/1996 | Authie | F42B 5/15 89/1.51 |
| 7,546,917 | B1 | * | 6/2009 | Lam | F42B 39/26 206/561 |
| 2009/0031887 | A1 | * | 2/2009 | Monteil | F41F 3/073 89/1.8 |
| 2009/0193962 | A1 | * | 8/2009 | Zachrisson | F42B 39/26 89/1.801 |
| 2013/0167711 | A1 | * | 7/2013 | Zatterqvist | F42B 12/70 89/1.56 |
| 2019/0128300 | A1 | | 5/2019 | Haser et al. | |
| 2023/0044326 | A1 | * | 2/2023 | Zätterqvist | F42B 5/15 |

FOREIGN PATENT DOCUMENTS

| | | | | |
|---|---|---|---|---|
| DE | 19541799 A1 | * | 5/1997 | B65D 25/06 |
| WO | 2010082882 A1 | | 7/2010 | |
| WO | 2010123423 A1 | | 10/2010 | |
| WO | 2010123424 A1 | | 10/2010 | |
| WO | 2017200454 A1 | | 11/2017 | |
| WO | 2018053512 A1 | | 3/2018 | |
| WO | 2018222110 A1 | | 12/2018 | |

* cited by examiner

SPRING ARRANGEMENT FOR COUNTERMEASURE MAGAZINES

CROSS-REFERENCE TO RELATED APPLICATIONS

This application is a 35 U.S.C § 371 national stage application for International Application No. PCT/SE2021/050805, entitled "SPRING ARRANGEMENT FOR COUNTERMEASURE MAGAZINES", filed on Aug. 18, 2021, which claims priority to Swedish Patent Publication No. 2000143-4, filed on Aug. 18, 2020, the disclosures and contents of which are hereby incorporated by reference in their entireties.

FIELD OF THE INVENTION

The present invention relates to a spring arrangement for use in a countermeasure magazine, and a countermeasure magazine.

BACKGROUND OF THE INVENTION

Traditional countermeasure dispensers comprise at least one countermeasure magazine holding a number of countermeasure cartridges. These cartridges can be activated to dispense said countermeasure when needed. When installed on a vehicle and that vehicle is in use, the countermeasure magazine and the cartridges held therein are subjected to vibrations. Over time, these vibrations may cause damages to the cartridges, thus requiring them to be periodically replaced. These replacements drive costs, both due to the time taken to replace and decommission the cartridges, but also due to the cost of the cartridges themselves. Furthermore, since it is difficult to accurately predict when any given cartridge will wear out, and due to the industry's strict requirements on reliability, significant safety margins need to be used when calculating the replacement period for the cartridges.

SUMMARY OF THE INVENTION

It is an object of the present invention to alleviate at least some of the mentioned drawbacks of the prior art and to provide a novel countermeasure magazine in which the countermeasure cartridges are subjected to less vibrations than in traditional countermeasure magazines. This and other objects, which will become apparent in the following, are accomplished by a spring arrangement for use in a countermeasure magazine, and a countermeasure magazine, as defined in the accompanying independent claims.

A benefit of the spring arrangement of the present invention is that it decreases the amount and intensity of vibrations the countermeasure cartridges held in a countermeasure magazine are subjected to. This decreases the frequency with which the cartridges need to be replaced. The spring arrangement does this by being arranged such that the cartridges are acted upon by spring elements from at least two directions. Thus, a pretension is provided in the countermeasure cartridge that prevents a portion of the vibrations otherwise experienced thereby.

The term exemplary should in this application be understood as serving as an example, instance or illustration.

According to the first aspect of the present invention, a spring arrangement for use in a countermeasure magazine is provided. Said spring arrangement comprises a plurality of elements, wherein each one of said elements has a base portion and a plurality of spring portions extending from a first edge of said base portion, and wherein said spring portions of each element are distributed along a length of said base portion, and wherein said elements comprise mating connection means such that said elements may be connected to each other.

By providing a spring arrangement according to the first aspect of the present invention, countermeasure cartridges may be held in place inside a countermeasure magazine in such a way so that vibrations between adjacent cartridges, and between cartridges and the magazine, are reduced. The spring arrangement does this by having a number of elements, each of which is provided with spring portions arranged along the length of a base portion thereof. By providing a number of such elements, it is possible to provide an environment in which the cartridges are protected from vibrations by the spring portions of each element of the spring arrangement. This increases the expected lifetime and decreases the required replacement frequency of the cartridges due to wear.

The base portion may alternatively be referred to as a body. From said base portion or body, the spring portions extend. Preferably, the base portion and the spring portions are made from a single piece of material. Alternatively, the base portion and the spring portions are made from separate pieces of material that are joined together by conventional fastening means.

The spring portions are characterized by their ability to elastically deform as a result of pressure from cartridges inserted into the countermeasure magazine with which the spring arrangement is to be used. As such, the spring portions define at least one cartridge holding space, or cartridge chamber, into which a countermeasure cartridge may be inserted. The cartridge holding space or cartridge chamber is dimensioned such that insertion of a cartridge therein elastically deforms the spring portions. This is achieved by having the spring portions of the spring arrangement extend into the cartridge chamber, so that a cartridge inserted into the cartridge chamber elastically deforms the spring portions upon insertion. This elastic deformation may for example be in the direction in which the largest vibrational movement is experienced by the cartridges during normal use of a countermeasure magazine holding said cartridges.

The spring portions are distributed along a length of the base portion, meaning that a number of spring portions are arranged sequentially or side-by-side over a lengthwise extension of said base portion. The lengthwise extension of said base portion is to be understood as being its longest extension.

According to one exemplary embodiment, said elements comprise mating connection means that are that are configured to connect said elements to each other. These connection means may be provided in the form of mating recesses and protrusions that allow the elements to be connected to one another. Additionally or alternatively, the connection means may be provided in the form of snap-lock features that allow the elements to be locked to one another. This allows the elements of the spring arrangement to form a structure or arrangement when connected to one another, in which countermeasure cartridges may be received. Additionally, the structure or arrangement may be configured such that it is connectable to a frame of a countermeasure magazine.

According to one exemplary embodiment, said mating connection means is such that cross lap joints are formed between said elements.

A cross lap joint is to be understood as being a joint between at least two elements. Said joint may be formed by providing each one of two elements with oppositely oriented recessed portions that are configured to mate with each other. The recessed portions may be arranged such that the elements mate with each other in a flush configuration. The recessed portions may be dimensioned such that when said two elements are connected to each other by joining or mating said recessed portions, a flush surface is formed at the edges of the two elements intersecting at the cross lap joint. Said recessed portion may have a depth that is equal to half the height of the element on which it is provided, with height being measured in a direction that is perpendicular to the lengthwise extension of the element. Alternatively, the recessed portion of one element may have a depth that is equal to the total height of the element with which it is configured to mate minus the depth of that other element's recess.

According to one exemplary embodiment, said mating connection means is a slit provided on each one of said elements.

According to one exemplary embodiment, said mating connection means are arranged such that lengthwise translational movement of either one of two connected elements is prevented. This locks the elements in place in relation to each other, such that the elements of the spring arrangement form a structure or arrangement, in which countermeasure cartridges may be received.

According to one exemplary embodiment, said plurality of elements is a first element and a second element, and said slits of said first element extend from said first edge of said base portion of said first element and said slits of said second element extend from a second edge of said base portion of said second element, and said first edge and said second edge are arranged on opposite sides of said base portion.

It should be understood that the edges of the base portions refer to the edges extending in a lengthwise direction thereof. The ends of the base portions refer to the proximity of the faces at either end of the base portion that are perpendicular to a lengthwise direction thereof.

According to one exemplary embodiment, said base portion of said first element may alternatively be referred to as said first base portion, and said base portion of said second element may alternatively be referred to as said second base portion. This also applies to any other constituent portion of said elements, e.g. said spring portions, said mating connection means, and said slits, mutatis mutandis.

According to one exemplary embodiment, said plurality of elements is a first element and a second element.

According to one exemplary embodiment, said slits of said second element extend from the same edge of the base portion as the spring portions and said slits of said first element extend from an opposite edge of said base portion. As such, the slits of the first element and the slits of the second element may intersect and mate, thus joining the first and the second element in a lap joint. This intersection of slits allow the elements to lock each other in place and prevent relative translational movement in a plane that is parallel with the lengthwise extensions of said two elements.

According to one exemplary embodiment, said base portions comprise magazine connectors arranged at two opposite ends of each one of said base portions.

Said magazine connectors may for example be protrusions or recesses configured to mate with corresponding recesses or protrusions on the magazine. Additionally or alternatively, the magazine connectors may be flexible snap-lock arrangements, locking mechanisms, mechanical fasteners, or similar. By providing magazine connectors at either end of the base portions, the spring arrangement may be connected to a frame of the countermeasure magazine.

According to one exemplary embodiment, said magazine connector of one of said first and said second elements comprises a locking mechanism such that said spring arrangement may be locked in place in relation to a frame of the countermeasure magazine. According to one exemplary embodiment, said magazine connector of said second element comprises said locking mechanism.

According to one exemplary embodiment, said locking mechanism is a snap-lock, a friction fit, or a mechanical fastener, configured to lock the element in place in relation to a frame of the countermeasure magazine. This increases the stability of the spring arrangement when connected to a countermeasure magazine, thus reducing the amount of vibrations transferred to countermeasure cartridges held by said countermeasure magazine. Furthermore, having the locking mechanism designed as a snap-lock or a friction fit allows a user to connect the elements of the spring arrangement to a countermeasure magazine without using any tools. This decreases the time it takes to assemble and dismantle the spring arrangement when used with a countermeasure magazine.

According to one exemplary embodiment, said base portion and said spring portions of each one of said plurality of elements are made from a single piece. This decreases assembly costs, and increases the stability of the element. Also, using a single piece of material for both the base portion and the spring portions of an element allows for a reduction of the total amount of material used in producing the spring arrangement.

According to one exemplary embodiment, each one of said elements is made from a single piece. In other words, the entire element may be made from a single piece, thus simplifying both production and assembly of the spring arrangement.

According to one exemplary embodiment, each one of said elements is made single piece of sheet metal. The sheet metal may for example be punched into the basic shape an element according to the present invention, after which the spring portions are formed by plastic deformation of a part of the element that protrudes from the base portion.

According to one exemplary embodiment, each one of said elements is made from a single piece of polymer sheet.

According to one exemplary embodiment, each one of said spring portions is a leaf spring. Having a leaf spring allows for efficient and effective biasing and vibration dampening of the cartridges held by the spring arrangement in the countermeasure magazine. For example, a cantilever spring or an elliptical leaf spring may be provided in the spring arrangement. According to one exemplary embodiment, each one of said spring portions is an elliptical leaf spring.

According to a second aspect of the present invention, a countermeasure magazine for use in a countermeasure dispenser is provided. Said countermeasure magazine comprises a frame and a spring arrangement according to the first aspect of the present invention, wherein said spring arrangement is connected to said frame such that said spring arrangement and said frame jointly define a grid of cartridge chambers.

Thus, a countermeasure magazine in which the countermeasure cartridges are subjected to less vibrations than in traditional countermeasure magazines is provided. The spring arrangement reduces the amount of vibrations the cartridges held in the countermeasure magazine experiences by biasing the cartridges in a plane that is parallel with the grid defined by the spring arrangement. The spring arrangement is arranged such that cartridges may be held in a biased manner between the spring portions of the spring arrangement. As the countermeasure magazine and the cartridges held therein are subjected to vibrations during use, providing the countermeasure magazine according to the second aspect of the present invention with a spring arrangement according to the first aspect of the present invention allows the expected lifetime of the cartridges to be increased. Increasing the lifetime, and thereby reducing the frequency of having to replace the cartridges, decreases maintenance costs of the countermeasure.

According to one exemplary embodiment of the present invention, said frame comprises guides arranged to receive said second edges of said elements of said spring arrangement. Thus, the elements may be more securely fastened to the frame of the countermeasure magazine, thereby further decreasing the amount of vibrations experienced by said cartridges held therein.

According to one exemplary embodiment of the present invention, said guides are a set of protrusions extending from said frame so as to alternatingly abut either lateral side of said element received therein. Lateral side is to be understood as being a portion of the base portion of an element. The lateral sides are the faces of the elements that extend between the two ends, the first edge, and the second edge of the base portion.

According to one exemplary embodiment of the present invention, said frame comprises a first set of openings arranged on two opposite side walls thereof, and a second set of openings arranged on two opposite side walls thereof, wherein said first and second set of openings are arranged to receive said magazine connectors.

Said openings may either be through-holes or recesses that are arranged to receive a magazine connector. Said first and second set of openings are arranged to receive said magazine connectors of said first and second element, respectively.

According to one exemplary embodiment of the present invention, said second set of openings is a set of elongated openings, in which said magazine connectors of said second element may be received and moved between a first and a second position, said second position being such that said second element is locked in place in relation to said frame. The second element being locked in place in relation to said frame may be achieved by the locking mechanism of said second element engaging with a locking portion of said elongated opening. Due to the configuration of the mating connection means of the first and second members, and the placement of the guides in the frame, locking the second element in place in relation to the frame after first mounting the first element in the frame causes the first element to be locked in place also.

According to one exemplary embodiment of the present invention, said set of elongated openings of said frame is configured such that said locking mechanism of said second element may slide from said first to said second position. The elongated opening may further comprise a protrusion arranged to engage the snap-lock arrangement of the second element when said second element is moved into said second position.

Generally, all terms used in the description are to be interpreted according to their ordinary meaning in the technical field, unless explicitly defined otherwise herein. All references to "a/an/the [element, device, component, means, step, etc.]" are to be interpreted openly as referring to at least one instance of said element, device, component, means, step, etc., unless explicitly stated otherwise.

BRIEF DESCRIPTION OF THE DRAWINGS

These and other features and advantages of the present invention will now be further clarified and described in more detail, with reference to the appended drawings showing different embodiments of a spring arrangement and of a countermeasure magazine according to the present invention.

DETAILED DESCRIPTION OF EMBODIMENTS

In the following detailed description, some embodiments of the present invention will be described. Spatial references such as upper, lower, distal, proximal, inner and outer are to be interpreted according to their normal meaning. To further clarify; up, upwards and upper refer to the direction from which the spring arrangement is connected to the frame. Similarly; down, downwards and lower refer to the opposite direction, i.e. the direction in which the second elements of the spring arrangement moves when moving from the first position to the second position. Inner and proximal should be interpreted in relation to a longitudinal centerline of the countermeasure magazine, as should outer and distal.

It is to be understood that features of the different embodiments are exchangeable between the embodiments and may be combined in different ways, unless anything else is specifically indicated. Even though in the following description, numerous specific details are set forth to provide a more thorough understanding of the present invention, it will be apparent to one skilled in the art that the present invention may be practiced without these specific details. In other instances, well known constructions or functions are not described in detail, so as not to obscure the present invention.

Figure 1:
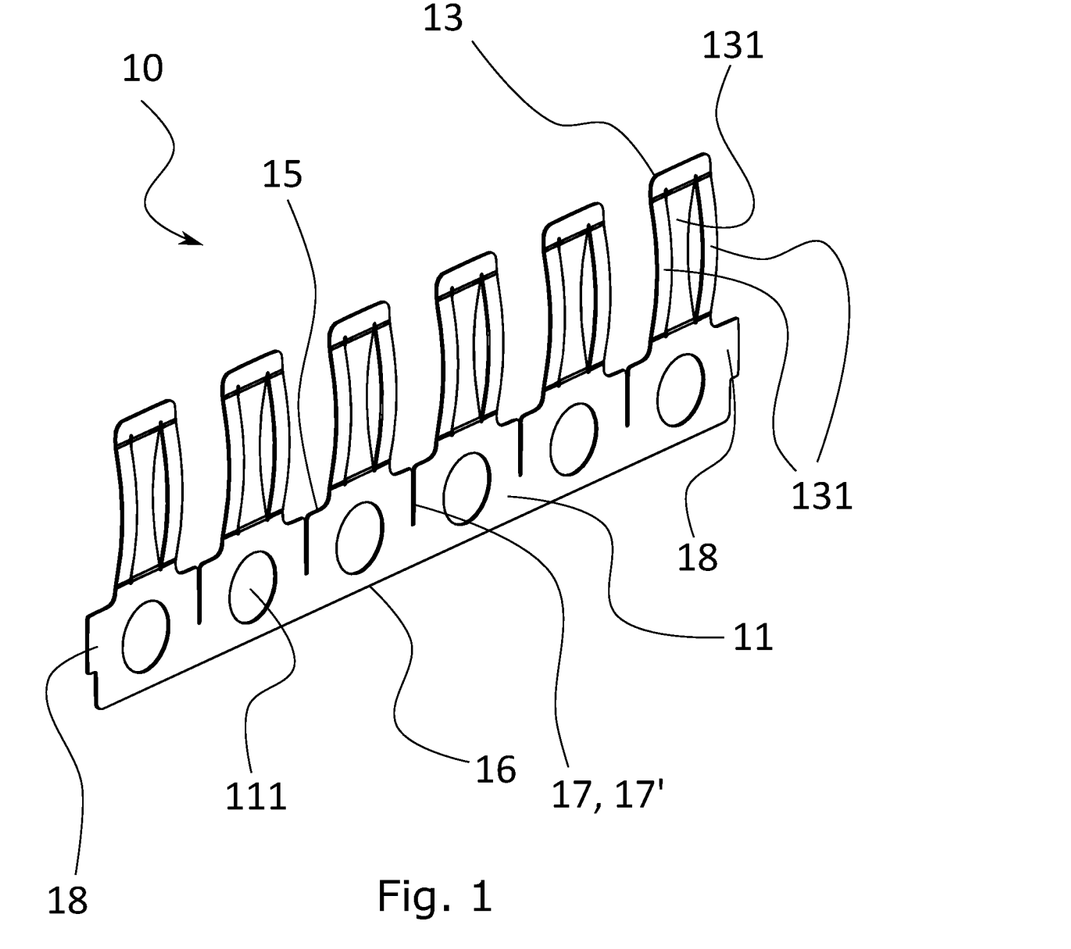
FIG. 1 is a perspective view of a first element of a spring arrangement.

FIG. 1 is a perspective view of a first element 10 of a spring arrangement 1. The first element 10 has a base portion 11 in the shape of a perforated band of sheet metal, as well as spring portions 13 extending therefrom. The base portion 11 is provided with through-holes 111 for reducing the weight of the spring arrangement 1. The through-holes 111 extend from one lateral side of the base portion 11 to the other, wherein the through-holes 11 are distributed along the longitudinal extension of the base portion 11.

The spring portions 13 extend from a first edge 15 of the base portion 11 in a direction that is perpendicular to the longitudinal extension of the base portion 11. In the illustrated example, there are six spring portions 13 extending from the base portion 11, the spring portion 13 being distributed along a length of the base portion 11. Each one of the spring portions 13 is provided in the shape of an elliptical leaf spring having three metal strips 131, two of which have a curved shape protruding in a first direction, and the third of which having a curved shape protruding in a second, opposite direction. The three strips of metal 131 are joined at the top and bottom, i.e. at both the most proximal and the most distal position relative to the base portion 11. The spring portions 13 are configured to elastically deform in a direction that is perpendicular to the longitudinal extension of both the spring portions 13 themselves, and the base portion 11 from which they extend. Thus, the spring portions 13 allow the spring arrangement 1 to dampen vibrations experienced by cartridges held in the cartridge chambers 35 defined by a grid 33 of spring elements 10, 20.

Furthermore, the first element 10 comprises mating connection means 17 in the shape of slits 17' for connecting the first element 10 to a second element 20. The slits 17' extend from the first edge 15 of the base portion 11, and towards the oppositely arranged second edge 16 of the base portion 11. The slits 17' extend half-way through the base portion 11, measured in a direction from the first edge 15 to the second edge 16. This, in combination with the shape of the mating connection means 27 of the second element 20, allow the two elements 10, 20 to be joined together with a cross lap joint 31. This is shown in greater detail in FIG. 3b.

FIG. 1 also shows magazine connectors 18 arranged at either end of the base portion 11. The magazine connectors 18 are arranged such that the first element 10 may be connected to a frame 41 or countermeasure magazine 4.

As is seen in FIG. 1, the base portion 11 and the spring portions 13 are made from a single piece of material. The first element 10 may for example be produced by punching out the outer shape of the first element 10 from a sheet of metal, and then plastically deform the strips to form the elliptical leaf spring of the spring portion 13.

Figure 2:
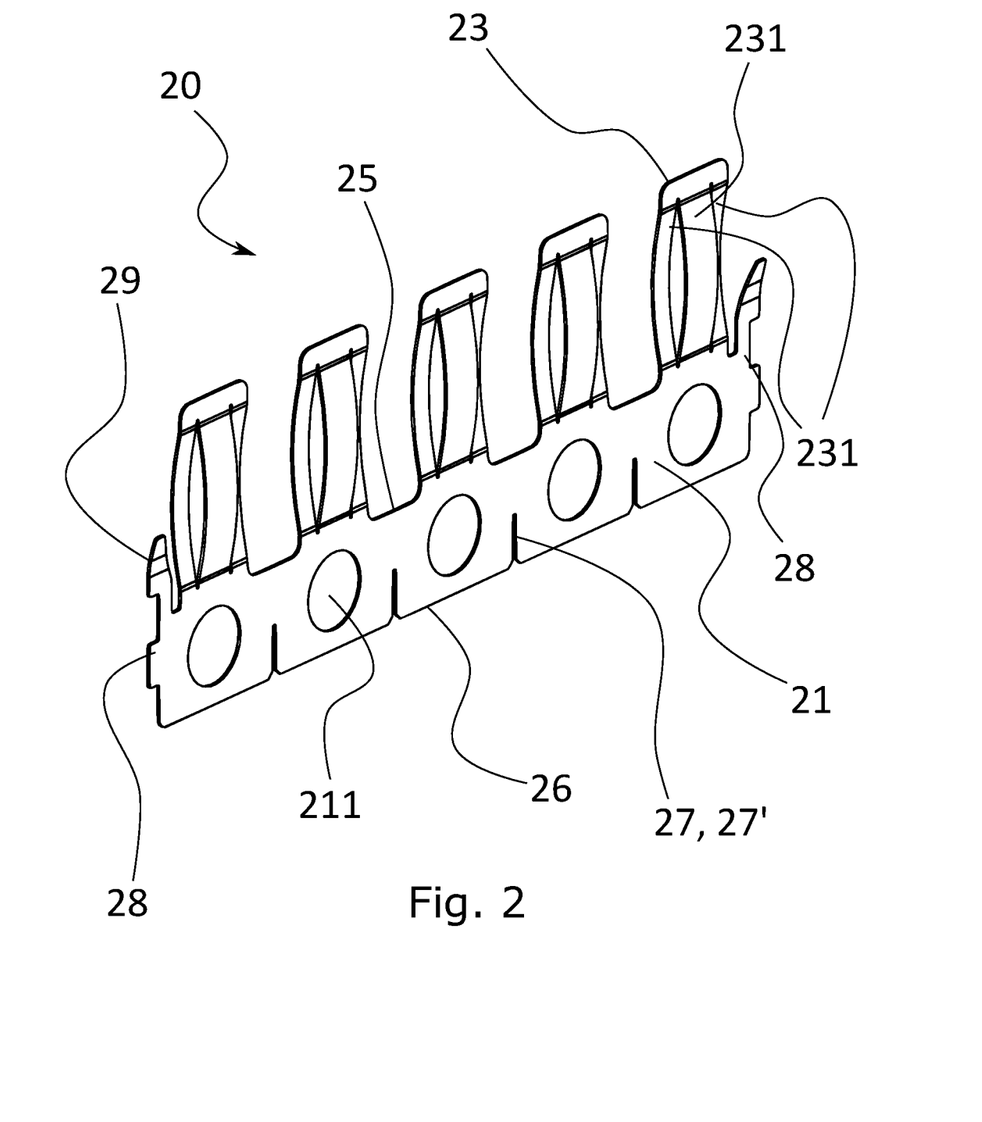
FIG. 2 is a perspective view of a second element of said spring arrangement.

FIG. 2 is a perspective view of a second element 20 of the spring arrangement 1. Like the first element 10, the second element 20 has a base portion 21 in the shape of a perforated band of sheet metal, as well as spring portions 23 extending therefrom. The base portion 21 is provided with through-holes 211 extending from one lateral side of the base portion 21 to the other, wherein the through-holes 21 are distributed along the longitudinal extension of the base portion 21.

The spring portions 23 extend from a first edge 25 of the base portion 21, in the same direction as with the first element 10. The spring portions 23 of the second element 20 are substantially identical to the spring portions 13 of the first element 10, and will therefore not be discussed in greater detail.

The second element 20 comprises mating connection means 27 in the shape of slits 27' for connecting the second element 20 to the first element 10. The slits 27' extend from the second edge 26 of the base portion 21, and towards the oppositely arranged first edge 25 of the base portion 21. The slits 27' extend half-way through the base portion 21, measured in a direction from the second edge 26 to the first edge 25. By joining the mating connection means 17 of the first element 10 with the mating connection means 27 of the second element 20, a cross lap joint 31 is formed. This is shown in greater detail in FIG. 3b.

FIG. 2 also shows magazine connectors 28 arranged at either end of the base portion 21. The magazine connectors 28 each comprises a locking mechanism 29 that allows the second element 20 to be locked in place in relation to a frame 41 or countermeasure magazine 4. With the mating connection means 17, 27 being arranged as they are, locking the second element 20 in place prevents the first element 10 from moving in a direction towards the spring portions 13, 23 of the two elements 10, 20. This is shown in greater detail in FIGS. 4a, 4b, and 5.

Figure 3A:
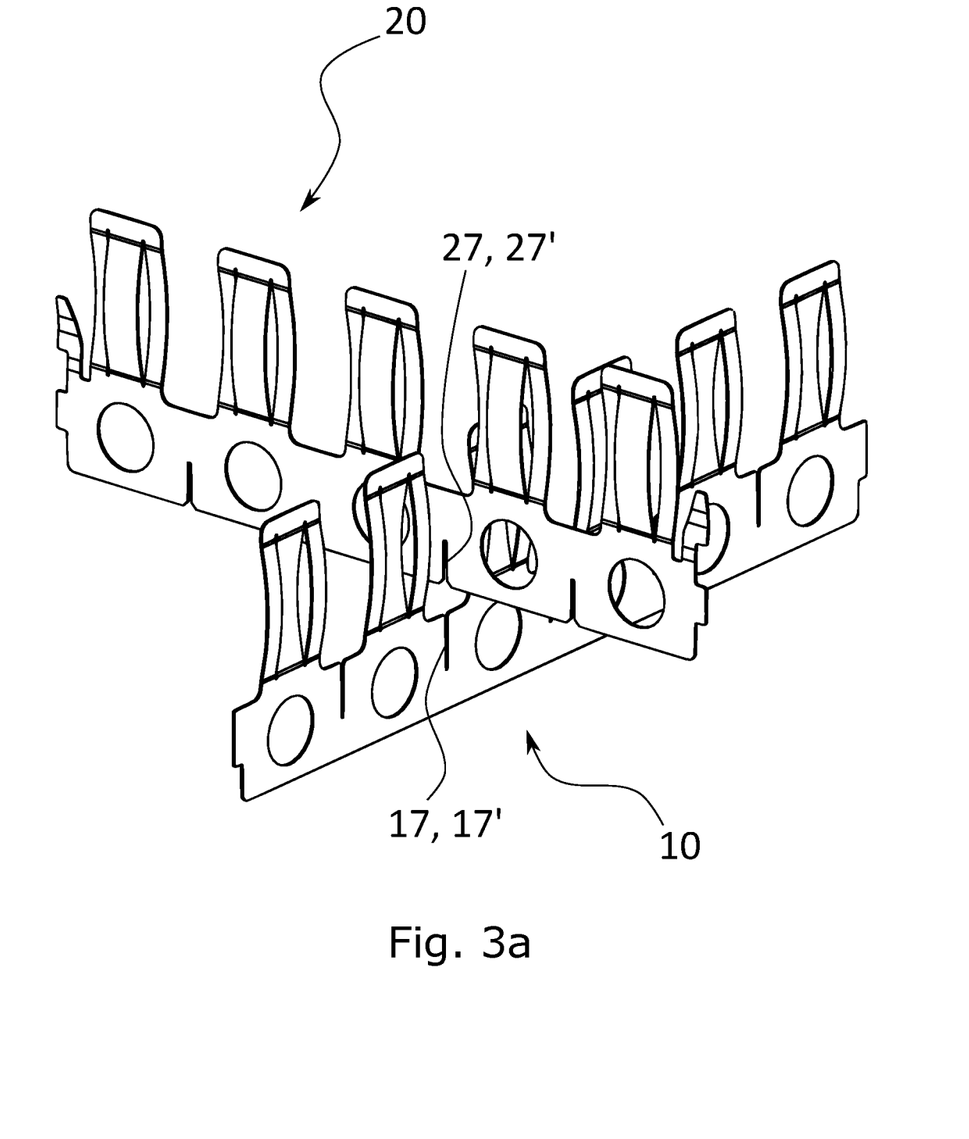
FIG. 3a is a perspective view of said first and second elements before connecting to each other.

FIG. 3a is a perspective view of the first and second elements 10, 20 before connecting to each other. Here, the two elements 10, 20 are provided at a right angle relative to each other, and their mating connection means 17, 27 are aligned with each other so as to allow the two elements 10, 20 to intersect.

Figure 3B:
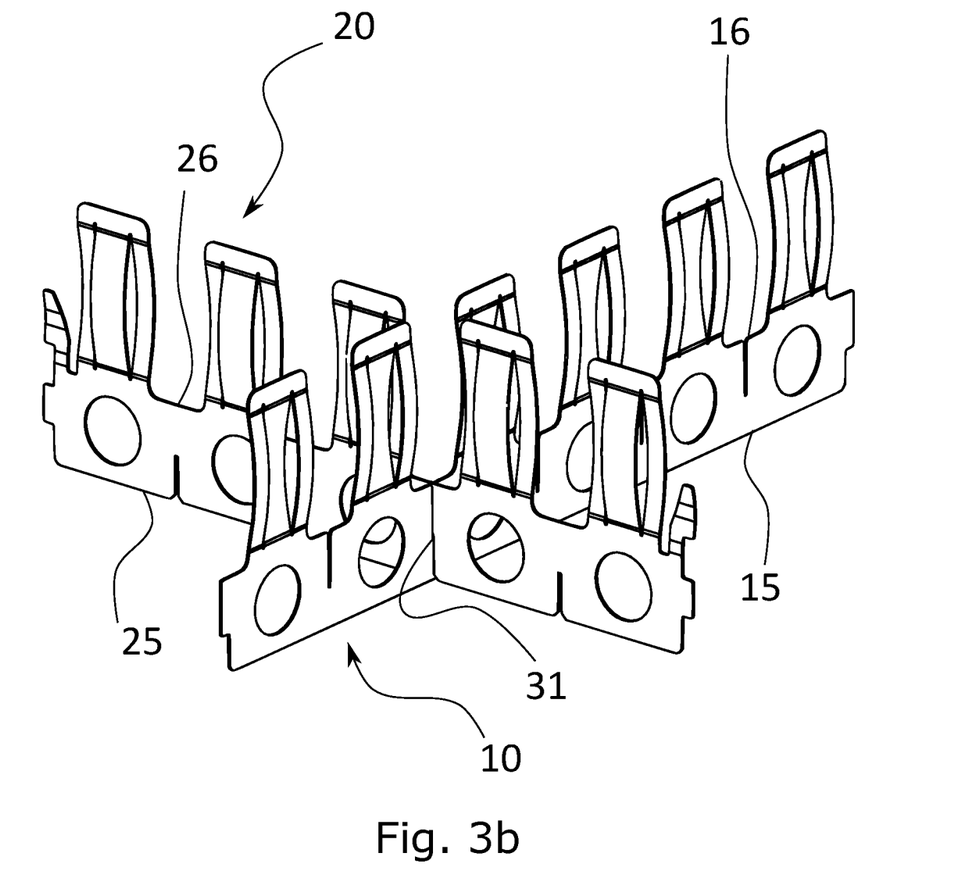
FIG. 3b is a perspective view of said first and second elements after being connected to each other.

FIG. 3b is a perspective view of the first and second elements 10, 20 after being connected to each other. Here, a cross lap joint 31 has been formed between the two elements 10, 20 by intersecting their mating connection means 17, 27. Due to the relative dimensioning of the mating connection means 17, 27 of each respective element 10, 20, a flush edge is formed at the intersection of the first edges 15, 25 of the two elements 10, 20, and at the intersection of their second edges 16, 26.

Figure 3C:
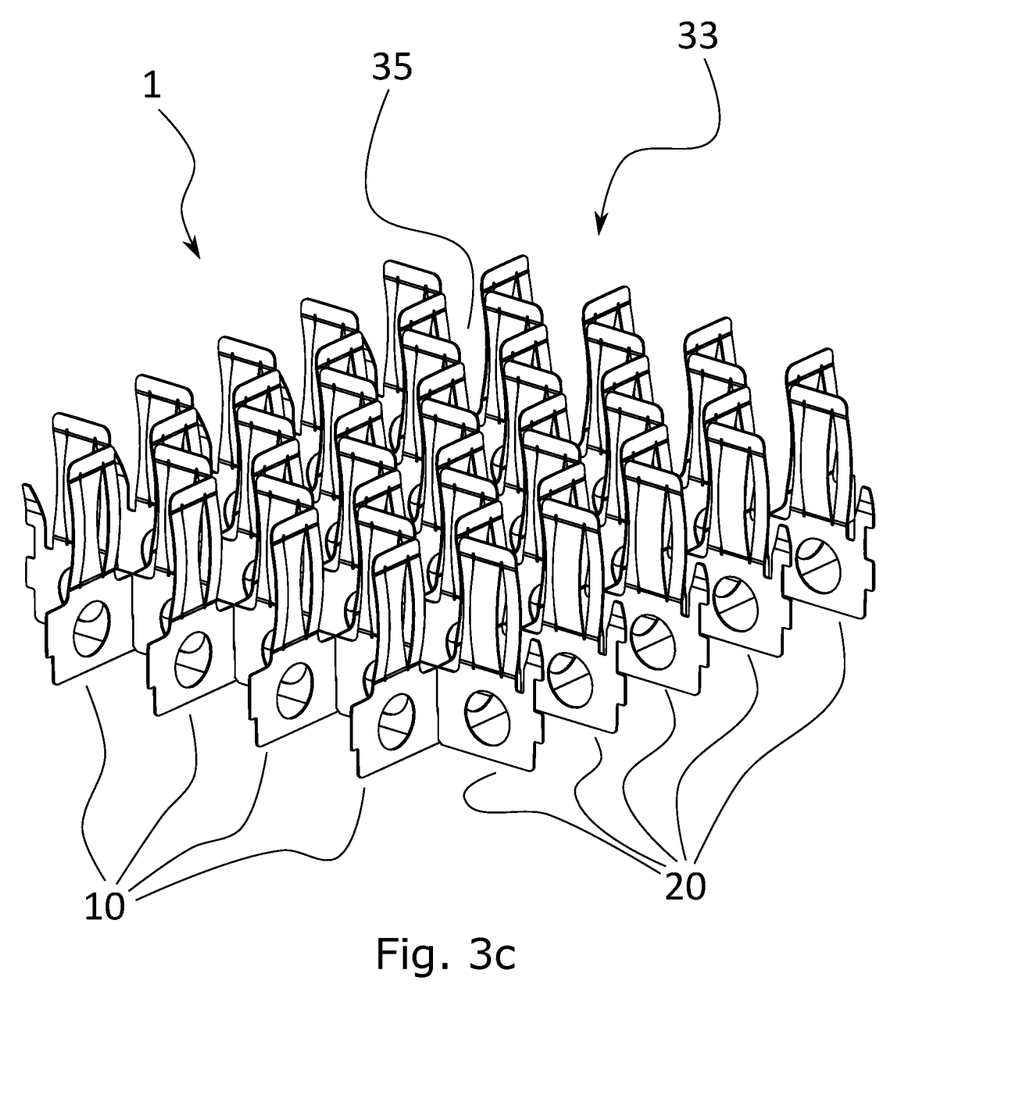
FIG. 3c is a perspective view of a plurality of first and second elements that have been connected to form a spring arrangement according to the present invention.

FIG. 3c is a perspective view of a plurality of first and second elements 10, that have been connected to each other. Each first element 10 is parallel with the other first elements 10, and each first element 10 is perpendicular to each one of the second elements 20. When connected to each other, the first and second elements 10, 20 form a spring arrangement 1 according to the present invention. The spring arrangement 1 defines a portion of a grid 33 of cartridge chambers 35, into which cartridges of countermeasure may be held. The outermost rows and columns of cartridge chambers 35 in the grid 33 are jointly defined by the spring arrangement 1 and the frame 41, when the spring arrangement 1 is connected thereto.

Figure 4A:
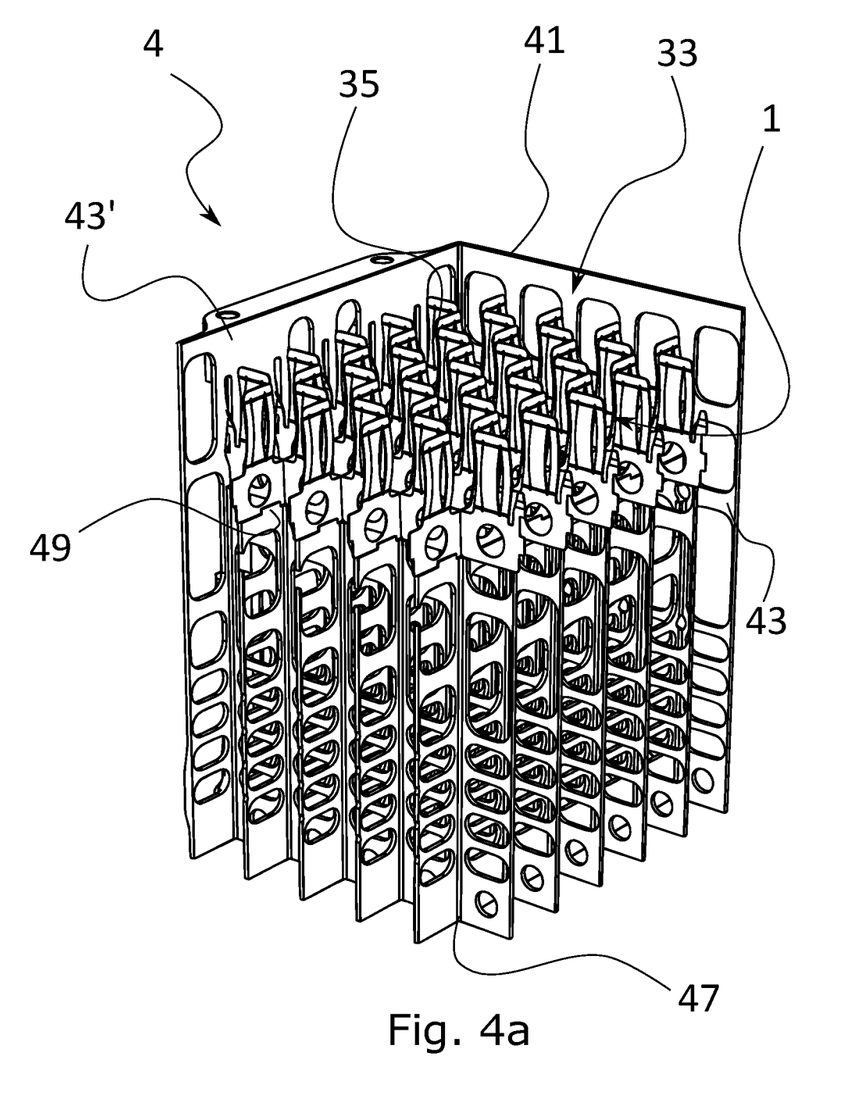
FIG. 4a is a perspective cutaway view of a countermeasure magazine comprising a spring arrangement according to the present invention.

FIG. 4a is a perspective cutaway view of a countermeasure magazine 4 comprising a spring arrangement 1 according to the present invention. The countermeasure magazine 4 comprises a frame 41, inside of which the spring arrangement 1 is held. The spring arrangement 1 is connected to the frame 41 in a manner such that the spring arrangement 1 and the frame 41 jointly define a grid 33 of cartridge chambers 35. The frame 41 is rectangular and has four walls 43, 43', on which walls 43, 43' openings 45, 45' are arranged that are configured to receive the magazine connectors 18, 28 of the first and second element 10, 20 of the spring arrangement 1. By connecting the magazine connectors 18, 28 to the openings 45, 45', the spring arrangement 1 may be locked in place in relation to the frame 41.

Furthermore, the frame 41 comprises a grid-like support structure 47 extending between the walls 43, 43' of the frame 41 and along a portion of the height of the frame 41. The support structure 47 is arranged to receive the spring arrangement 1 on top thereof, and consequently does not extend all the way to the top of the frame 41. This leaves room for placement of the spring arrangement 1 thereupon.

Additionally, the support structure 47 is provided with guides 49 that are arranged to receive the second edges 16, 26 of the elements 10, 20 of the spring arrangement 1. The guides 49 are provided in the shape of flanges or protrusions extending from the top of the support structure 47, and being dimensioned to abut at least one side of the base portions 11, 21 of the spring arrangement 1. Thus, the elements 10, 20 may be more securely fastened to the frame 41 of the countermeasure magazine 4. Finally, the support structure 47 is arranged to support cartridges loaded into the countermeasure magazine 4, and separate them from one another.

Figure 4B:
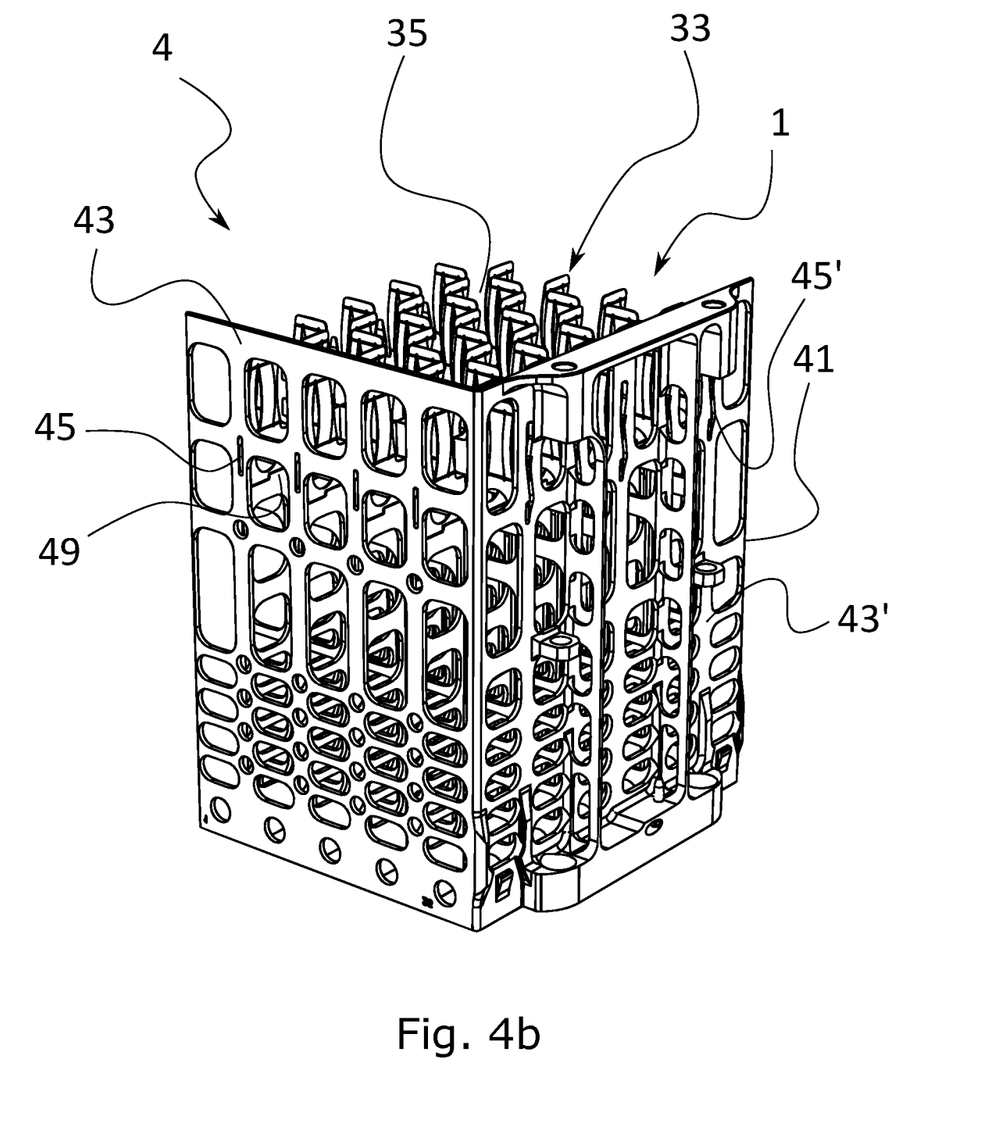
FIG. 4b is another perspective cutaway view of the countermeasure magazine of FIG. 4a, FIG. 5 is a detailed view of the second set of openings of the frame, and the magazine connectors of said second elements.

FIG. 4b is another perspective cutaway view of the countermeasure magazine 4 of FIG. 4a. Here, the openings 45, 45' in the walls 43, 43' of the frame 41 are more clearly seen. On one pair of opposing walls 43 of the frame 41, the openings 45 are shaped to receive the magazine connectors 18 of the first elements in a way so that the first elements are prevented from moving in any direction without deforming, e.g. bending, the element 10. In other words, the inner dimensions of these openings 45 are substantially the same as the outer dimensions of the protruding portion of the magazine connectors 18 of the first elements 10. On the other pair of opposing walls 43', a set of elongated openings 45' is provided. In these openings 45', the magazine connectors 28 of the second element 20 may be received and moved between a first and a second position. The first position is when the magazine connector 28 of the second element 20 has been received by the upper portion of the elongated opening 45', and the second position is when the second element has been slid downwards so that the magazine connector 28 moves past and engages the protrusion 46 of the elongated opening 45'. This allows the second element 20 to be connected to the frame 41 in a first position, before being moved to a second position in which the first and second elements 10, 20 intersect to form a cross lap joint 31. Also, in the second position, a locking mechanism 29 of the magazine connector 28 of the second element 20 engages with a protrusion 46 of the elongated opening 45' to lock the second element 20 in place in relation to the frame 41.

Figure 5:
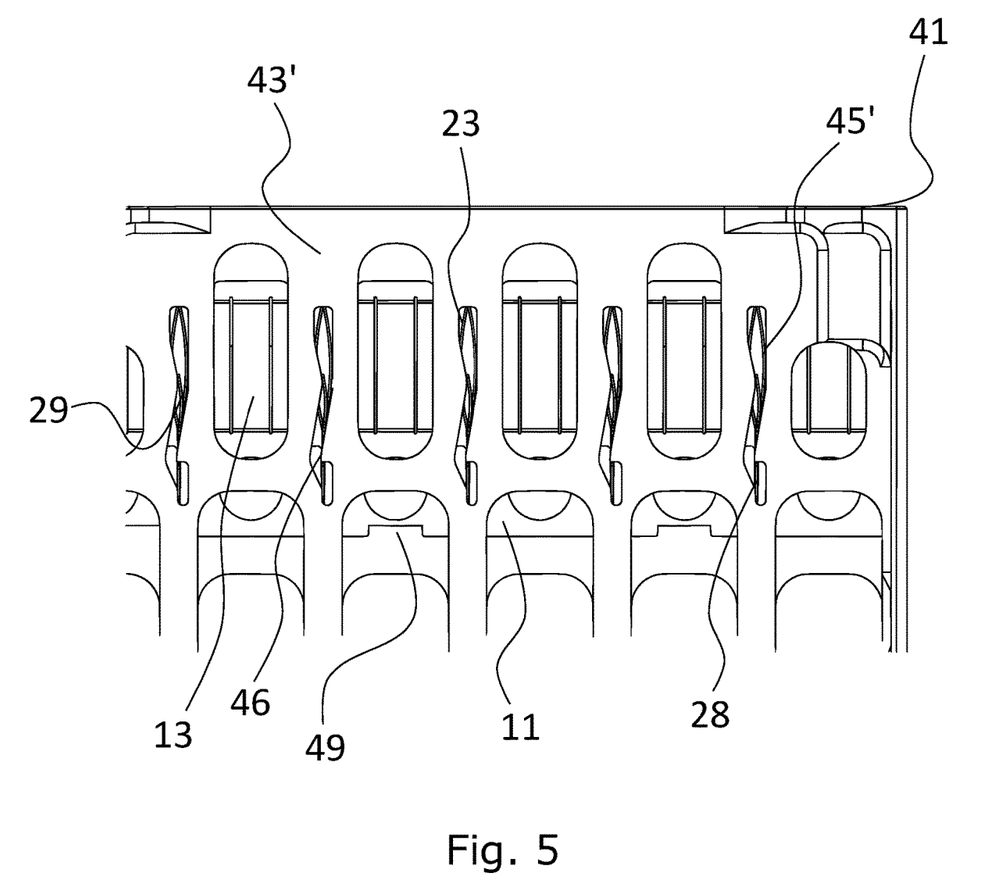

FIG. 5 is a detailed view of the elongated openings 45' of the frame 41, and the magazine connectors 28 of the second elements 20. Here, the second elements have been moved to the second position, in which the snap-lock locking mechanism 29 of the second element 20 has engaged the protrusion 46 of the elongated opening 45' so as to prevent the second element from moving back to the first position in the elongated opening 45'. Thus, the cross lap joint 31 causes the first element 10 to be held in place by the second element 20, which in turn is held in place by the snap-lock locking mechanism 29 having engaged the protrusion 46 of the elongated opening 45'. The spring arrangement 1 as a whole is held in place by the guides 49 on the frame 41, and the walls 43, 43' of the frame 41.

The person skilled in the art realizes that the present invention by no means is limited to the embodiments described above. The features of the described embodiments may be combined in different ways, and many modifications and variations are possible within the scope of the appended claims. In the claims, any reference signs placed between parentheses shall not be construed as limiting to the claim. The word "comprising" does not exclude the presence of other elements or steps than those listed in the claim. The word "a" or "an" preceding an element does not exclude the presence of a plurality of such elements.

The invention claimed is:

1. A spring arrangement in a countermeasure magazine, said spring arrangement comprising a plurality of elements,
   wherein each one of said elements has a base portion and a plurality of spring portions extending from a first edge of said base portion,
   wherein said spring portions of each element are distributed along a length of said base portion,
   wherein said elements comprise mating connection means such that said elements are connected to each other,
   wherein said base portions comprise magazine connectors arranged at two opposite ends of each one of said base portions and wherein at least one of said magazine connectors comprises a locking mechanism such that said spring arrangement is locked in place in relation to a countermeasure magazine.

2. The spring arrangement according to claim 1, wherein said mating connection means is a slit provided on each one of said elements such that cross lap joints are formed between said elements.

3. The spring arrangement according to claim 2, wherein said plurality of elements comprise a first element and a second element, and wherein said slits of said first element extend from said first edge of said base portion of said first element and said slits of said second element extend from a second edge of said base portion of said second element, wherein said first edge and said second edge are arranged on opposite sides of said base portion.

4. The spring arrangement according to claim 1, wherein said base portion and said spring portions of each one of said plurality of elements are made from a single piece.

5. The spring arrangement according to claim 1, wherein each one of said spring portions is a leaf spring.

6. The spring arrangement according to claim 1, wherein said elements are made from sheet metal.

7. A countermeasure magazine in a countermeasure dispenser, said countermeasure magazine comprising a frame and a spring arrangement comprising a plurality of elements,
   wherein each element of the plurality of elements has a base portion and a plurality of spring portions extending from a first edge of said base portion,
   wherein said base portions comprise magazine connectors arranged at two opposite ends of each one of said base portions and wherein at least one of said magazine connectors comprises a locking mechanism such that said spring arrangement is locked in place in relation to a countermeasure magazine,
   wherein said spring portions of each element are distributed along a length of said base portion,
   wherein the plurality of elements comprises mating connection means such that said elements are connected to each other, and
   wherein said spring arrangement is connected to said frame such that said spring arrangement and said frame jointly define a grid of cartridge chambers.

8. The countermeasure magazine according to claim 7, wherein said frame comprises a first set of openings arranged on two opposite side walls thereof, and a second set of openings arranged on two opposite side walls thereof, wherein said first and second set of openings are arranged to receive magazine connectors of each element.

9. The countermeasure magazine according to claim 8, wherein said second set of openings is a set of elongated openings, in which magazine connectors of at least one of said elements are received and moved between a first and a second position, said second position being such that said at least one of said elements is locked in place in relation to said frame.

10. The countermeasure magazine according to claim 7, wherein said frame comprises guides arranged to receive second edges of said elements of said spring arrangement.

* * * * *